UNITED STATES PATENT OFFICE.

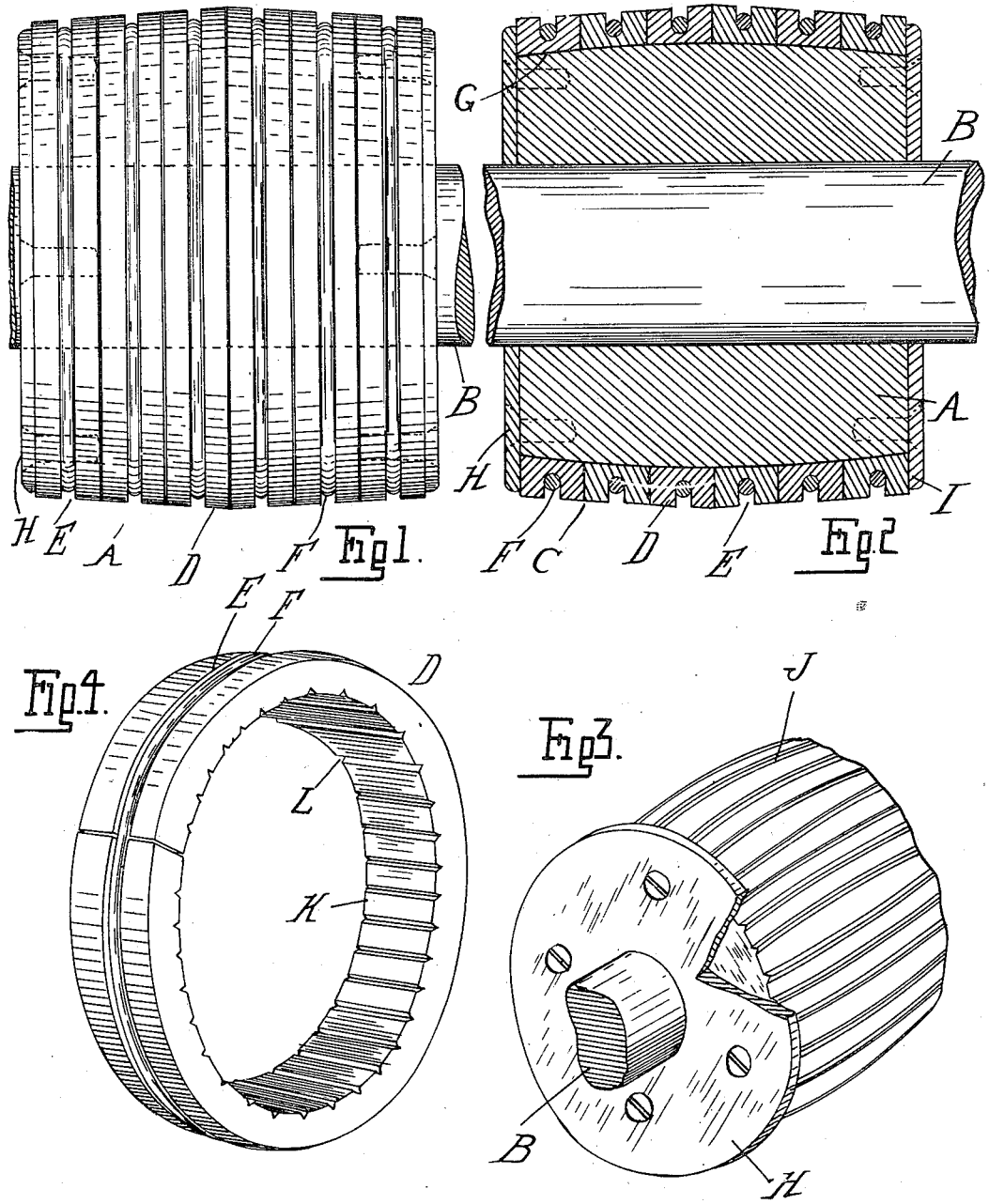

ARTHUR W. NELSON, OF CHICAGO, ILLINOIS.

PULLEY.

1,034,491.  Specification of Letters Patent.  Patented Aug. 6, 1912.

Application filed June 26, 1909. Serial No. 504,523.

*To all whom it may concern:*

Be it known that I, ARTHUR W. NELSON, a citizen of the United States of America, residing at Chicago, in the county of Cook and State of Illinois, have invented certain new and useful Improvements in Pulleys, of which the following is a specification, reference being had therein to the accompanying drawings.

The invention relates particularly to a tractional surface or covering for pulleys, preferably of yielding material, whereby the maximum driving power for the belt may be secured with a minimum tension and less friction on the bearings.

The invention consists in a removable tractional facing, in its novel and simple construction, in retaining means for uniting the facing to the periphery of the pulley, and still further in various details of construction as will be more fully hereinafter set forth.

In the drawings,—Figure 1 is an elevation of a pulley, with my improved covering or tractional facing applied; Fig. 2 is a vertical central section therethrough; Fig. 3 is a sectional perspective view of a modified form of pulley, with the covering removed; and Fig. 4 is a perspective view of a section of the preferred form of traction facing.

In the drawings thus briefly described, A designates a pulley of any approved type, B the shaft on which it is suitably mounted, and C the tractional facing, the latter in its preferred form consisting of a series of ring-shaped sections D formed preferably of leather or other suitable relatively yielding material. The surface sections referred to are preferably formed each of a strip of leather, bent into circular form, as shown in Fig. 4, and having an annular groove E formed in its periphery substantially midway of its edges, in which is located a retainer F in the form preferably of a metal ring, the groove being sufficiently deep when the section is in place to position the ring below the section surface, so as to be out of contact with the belt. The surface sections being thus formed, they are placed upon the pulley in the manner indicated in Fig. 2, having preferably a driving fit thereon, which causes the retainers to tightly clamp the sections in place. In the figure last referred to, I have shown the pulley as of the crown type, the periphery G tapering from the center to each end or edge and the sections being correspondingly tapered so as to fit the surface. I may and preferably do employ end retainers, as H, screwed or otherwise secured to the pulley ends, and of a diameter to project beyond the pulley periphery to form the retaining portions I. The pulley periphery G may also if desired be ribbed, as indicated in Fig. 3, a circumferential series of longitudinal projections J being formed thereon and spaced apart. With this form of pulley, the inner surfaces K of the sections are transversely scored, as at L, the scores being adapted to receive the ribs and acting to prevent relative circumferential movement.

A tractional facing of the character described provides the additional driving power desired, and at the same time can be conveniently made and applied and cheaply manufactured. I have shown the desired form of tractional facing, consisting of a series of independent annular sections, but I wish it understood that I do not desire to be limited to this particular form, as various modifications may be made without in any manner departing from the spirit of my invention.

What I claim as my invention is,—

1. The combination with a pulley having a series of equi-distant transverse ribs formed on the periphery thereof, of a removable traction facing consisting of a plurality of narrow annular bands, each having a like series of transverse scores formed on their inner faces for engagement with the ribs and having their outer faces centrally grooved circumferentially thereabout, and a retaining ring for each band seated and held within the groove, said annular bands being adapted to have a driving fit with the periphery of the pulley.

2. The combination with a pulley, of a removable traction facing therefor consisting of a plurality of narrow annular bands centrally grooved circumferentially thereabout, and a clamping ring for each band seated within the groove, said annular bands being adapted to have a driving fit with the periphery of the pulley and clamped thereto solely through the medium of the clamping ring.

3. The combination with a pulley having transverse ribs formed in the periphery thereof, of a removable traction facing consisting of a plurality of narrow annular bands, each having a transverse score formed on its inner face for engagement with the ribs and having their outer faces centrally grooved circumferentially thereabout, and a retaining ring for each band seated and held within the groove, said annular bands being adapted to have a driving fit with the periphery of the pulley.

In testimony whereof I affix my signature in presence of two witnesses.

ARTHUR W. NELSON.

Witnesses:
OLIVER L. DAVIS,
ROY H. McLEAN.

Copies of this patent may be obtained for five cents each, by addressing the "Commissioner of Patents, Washington, D. C."